(12) United States Patent
Nie et al.

(10) Patent No.: US 11,339,291 B2
(45) Date of Patent: May 24, 2022

(54) POLYSILOXANE COMPOSITION

(71) Applicant: WACKER CHEMIE AG, Munich (DE)

(72) Inventors: Jian Nie, Shanghai (CN); Lei Yang, Shanghai (CN)

(73) Assignee: Wacker Chemie AG, Munich (DE)

(*) Notice: Subject to any disclaimer, the term of this patent is extended or adjusted under 35 U.S.C. 154(b) by 0 days.

(21) Appl. No.: 17/056,576

(22) PCT Filed: May 18, 2018

(86) PCT No.: PCT/CN2018/087419
§ 371 (c)(1),
(2) Date: Nov. 18, 2020

(87) PCT Pub. No.: WO2019/218330
PCT Pub. Date: Nov. 21, 2019

(65) Prior Publication Data
US 2021/0179850 A1    Jun. 17, 2021

(51) Int. Cl.
*C08L 83/06* (2006.01)
*C08K 3/26* (2006.01)
*C08K 3/36* (2006.01)
*C08F 283/12* (2006.01)

(52) U.S. Cl.
CPC .......... *C08L 83/06* (2013.01); *C08F 283/122* (2013.01); *C08K 3/26* (2013.01); *C08K 3/36* (2013.01); *C08K 2003/265* (2013.01)

(58) Field of Classification Search
CPC ....... C08L 83/06; C08F 283/122; C08K 3/26; C08K 3/36; C08K 2003/265

USPC ....................................................... 524/427
See application file for complete search history.

(56) References Cited

U.S. PATENT DOCUMENTS

| 6,008,284 A | 12/1999 | Nylund et al. |
| 2010/0043945 A1 | 2/2010 | Dohner et al. |

FOREIGN PATENT DOCUMENTS

| CN | 102757647 A | * | 10/2012 |
| CN | 102757647 A |   | 10/2012 |
| CN | 102898839 A |   | 1/2013 |
| CN | 105273679 A |   | 1/2016 |
| DE | 102016200704 A1 |   | 7/2017 |
| EP | 0905194 A3 |   | 2/2000 |
| EP | 1923361 A1 |   | 5/2008 |
| EP | 3279267 B1 |   | 9/2019 |
| GB | 2424898 A |   | 10/2006 |
| JP | 01124678 A | * | 5/1989 |
| JP | 11246768 A |   | 9/1999 |
| JP | 2010209269 A |   | 9/2010 |

OTHER PUBLICATIONS

JP 2010209269 A, English Machine Translation.

* cited by examiner

*Primary Examiner* — Kelechi C Egwim
(74) *Attorney, Agent, or Firm* — Brooks Kushman P.C.

(57) ABSTRACT

Viscosity peaking during initial formulation of condensation curing compositions employing silanol-functional organopolysiloxanes and alkoxysilanes is avoided by employing specific titanium compounds. A curing catalyst which may be a titanium compound or a tin compound may be added following disappearance of silanol functionality.

15 Claims, No Drawings

POLYSILOXANE COMPOSITION

CROSS REFERENCE TO RELATED APPLICATIONS

This application is the U.S. National Phase of PCT Appln. No. PCT/CN2018/087419 filed May 18, 2018, the disclosure of which is incorporated in its entirety by reference herein.

BACKGROUND OF THE INVENTION

1. Field of the Invention

The present invention relates to a polysiloxane composition, and particularly to an alkoxy-curing polysiloxane composition that can cure at room temperature and reduce or eliminate viscosity peaks during the preparation process.

2. Description of the Related Art

Alkoxy-curing one-component room temperature vulcanized (RTV-1) silicone rubbers are usually formulated with α,ω-dihydroxypolydimethylsiloxane as a base polymer, methyltrimethoxysilane as a cross-linking agent, organotitanium as a catalyst, and optionally fillers and additives. In the production of alkoxy-curing RTV-1 rubbers, following the addition of organotitanium catalyst to α,ω-dihydroxypolydimethylsiloxane, the reaction between the hydroxyl groups in the polymer and the organotitanium usually leads to a viscosity increase or even gelling of the system—this phenomenon is also known as "viscosity peak." The common solution to this issue is to reduce the viscosity of rubber compounds by high-speed shearing and letting stand for a period of time. This however is not so effective, especially for alkoxy-curing RTV-1 silicone rubber systems without fillers or with fumed silica as filler, and also brings great inconvenience to production.

To avoid viscosity peaks during mixing the polymer with the organotitanium catalyst, an alkoxy-terminated polydimethylsiloxane is used as the base polymer, which is typically prepared by reacting a hydroxyl-terminated polydimethylsiloxane with an alkoxysilane in the presence of a catalyst. This method however requires the preparation of the polymer in advance, being a complicated process at high cost.

SUMMARY OF THE INVENTION

In order to reduce or eliminate viscosity peaks during the production of alkoxy-curing RTV-1 silicone rubbers without impairing subsequent curing, a first aspect of the present invention provides a polysiloxane composition comprising the following ingredients:
 (a) a hydroxyl-terminated polyorganosiloxane;
 (b) a multifunctional alkoxysilane; and
 (c) an organotitanium compound having the following general formula I or II, or a multipolymer thereof having a degree of polymerization of from 2 to 10,
  (i) an organotitanium compound I with the following general formula I,

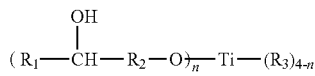

where n is an arbitrary integer between 1 and 4,
$R_1$ is a saturated monovalent hydrocarbon group having from 1 to 16 carbon atoms,
$R_2$ is a saturated divalent hydrocarbon group having from 1 to 16 carbon atoms,
$R_3$ is a saturated monovalent hydrocarbon group having from 1 to 32 carbon atoms,
wherein the hydrocarbon groups may be linear and/or branched;
 (ii) an organotitanium compound II with the following general formula II,

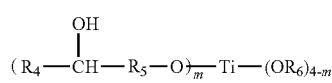

where m is an arbitrary integer between 2 and 4,
$R_4$ is a saturated monovalent hydrocarbon group having from 1 to 16 carbon atoms,
$R_5$ is a saturated divalent hydrocarbon group having from 1 to 16 carbon atoms,
$R_6$ is a saturated monovalent hydrocarbon group having from 4 to 32 carbon atoms,
wherein the hydrocarbon groups may be both linear and/or branched;
optionally,
further comprising a catalyst (d).
Ingredient (a)

DETAILED DESCRIPTION OF THE PREFERRED EMBODIMENTS

According to the present invention, ingredient (a) is used as a base polymer, which can be selected from among various hydroxyl-terminated polyorganosiloxanes or mixtures thereof conventionally used in the art for preparing RTV-1 silicone rubbers, generally being one or more α,ω-dihydroxypolydimethylsiloxanes with a kinematic viscosity at 25° C. of from 500 to 350,000 mm²/s, preferably containing at least one α,ω-dihydroxypolydimethylsiloxane with a kinematic viscosity at 25° C. of from 1,000 to 100,000 mm²/s for example from 20,000 to 100,000 mm²/s. As used herein, the term "kinematic viscosity" is measured according to DIN 51562, unless otherwise specified. The higher the kinematic viscosity of the hydroxyl-terminated polyorganosiloxane, the lower its hydroxyl content. The commonly used α,ω-dihydroxypolydimethylsiloxane has a hydroxyl content in the range of from 0.01 wt % to 0.2 wt %, based on the mass of the α,ω-dihydroxypolydimethylsiloxane.

According to the present invention, ingredient (a) is usually used in an amount of from 10 wt % to 85 wt %, for example, from 30 wt % to 85 wt %, based on the total weight of the starting materials of the polysiloxane composition.
Ingredient (b)
According to the present invention, ingredient (b) serves as a crosslinking agent, which can be selected from among various multifunctional alkoxysilane crosslinking agents having a functionality ≥3 that are conventionally used in the art for preparing alkoxy-curing RTV-1 silicone rubbers. Examples of suitable multifunctional alkoxysilanes include methyltrimethoxysilane, methyltriethoxysilane, vinyltrimethoxysilane, vinyltriethoxysilane, tetramethoxysilane, tetraethoxyoxysilane, phenyltrimethoxysilane, phenyltriethoxysilane, but not limited thereto. In order to shorten the reaction time of the silanol groups in ingredient (a), ingredient (b) is preferably a vinyl group-containing multifunctional alkoxysilane.

According to the present invention, the amount of ingredient (b) can be specified by those skilled in the art according to the formulation of conventional alkoxy-curing RTV-1 silicone rubbers, depending on the amount of the silanol groups in ingredient (a). In general, ingredient (b) is used in an amount of from 0.5 wt % to 5 wt %, based on the total weight of the starting materials of the polysiloxane composition.

In some embodiments of the present invention, ingredient (a) is used in an amount of from 10 to 85 parts, preferably from 30 to 85 parts, while ingredient (b) is used in an amount of from 0.5 to 5 parts, preferably from 0.5 to 4.5 parts, based on 100 parts by weight of total starting materials of the polysiloxane composition.

Ingredient (c)

According to the present invention, ingredient (c) can cause complete or almost complete reaction of the terminal hydroxyl groups in ingredient (a) so as to reduce or eliminate sharp viscosity increase or even gelling of the system after the addition of the organotitanium catalyst to ingredient (a), without affecting the crosslinking of ingredients (a) and (b).

In the general formula of the organotitanium compound I, n is preferably an arbitrary integer between 2 and 4, for example 2, 3 or 4. $R_1$ is preferably a saturated monovalent hydrocarbon group having from 1 to 10 carbon atoms, more preferably from 1 to 6 carbon atoms, such as methyl, ethyl, n-propyl, isopropyl, n-butyl, isobutyl, t-butyl, n-pentyl, isopentyl, t-pentyl, n-hexyl, isohexyl and t-hexyl, particularly preferably a saturated monovalent hydrocarbon group having from 2 to 4 for example 3 carbon atoms, such as n-propyl. $R_2$ is preferably a saturated divalent hydrocarbon group having from 1 to 10 carbon atoms, more preferably from 1 to 6 carbon atoms, such as —$CH_2$—, —$(CH_2)_2$—, —$(CH_2)_3$—, —$CH(CH_3)$—$CH_2$—, —$(CH_2)_4$—, —$CH(CH_3)$—$(CH_2)_2$—, —$CH_2CH(CH_3)$—$CH_2$—, —$CH(CH_2CH_3)$—$CH_2$—, —$(CH_2)_5$—, —$CH(CH_3)$—$(CH_2)_3$—, —$CH(CH_2CH_3)$—$(CH_2)_2$—, —$(CH_2)_6$—, —$CH(CH_3)$—$(CH_2)_4$—, —$CH(CH_2CH_3)$—$(CH_2)_3$—, particularly preferably a saturated divalent hydrocarbon group having from 3 to 5 for example 4 carbon atoms, such as —$CH(CH_2CH_3)$—$CH_2$—. $R_3$ is preferably a saturated monovalent hydrocarbon group having from 1 to 20 carbon atoms, more preferably having from 1 to 12 carbon atoms, such as butyl, pentyl, hexyl, heptyl, octyl, etc.

In the general formula of the organotitanium compound II, m is preferably 3 or 4, $R_4$ is defined as said $R_1$, $R_5$ is defined as said $R_2$, $R_6$ is preferably a saturated monovalent hydrocarbon group having from 4 to 20 carbon atoms, more preferably having from 6 to 12 carbon atoms, such as hexyl, heptyl, octyl, etc.

The structural formula of the multipolymer of organotitanium compound is determined by that of the compound. For example, if the structural formula of compound I is

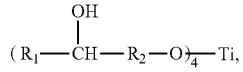

that of the multipolymer is

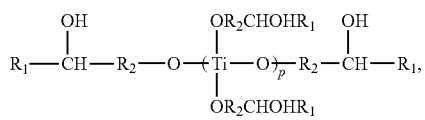

where p=2-10.

According to the present invention, the amount of ingredient (c) is mainly determined by that of ingredient (a). In some embodiments of the present invention, ingredient (a) is used in an amount of from 10 to 85 parts, preferably from 30 to 85 parts, while ingredient (c) is used in an amount of from 0.01 to 2 parts, preferably from 0.05 to 1.5 parts, based on 100 parts by weight of total starting materials of the polysiloxane composition. If the amount of ingredient (c) is lower than the above range, the silanol groups in ingredient (a) cannot be completely consumed in the reaction, and after the addition of the organotitanium catalyst to ingredient (a), the viscosity of the system still increases significantly. If the amount of ingredient (c) is higher than the above range, the tack-free time of the product will be affected.

Ingredient (d)

According to the present invention, the catalyst can be selected from among various organotitanium catalysts (d1) or organotin catalysts (d2) conventionally used in the art. Examples of suitable organotitanium catalysts include tetra-n-butyl titanate (Tn-BT), tetraisobutyl titanate (Ti-BT), tetra-t-butyl titanate (Tt-BT), tetraisopropyl titanate (Ti-PT), tetraisooctyl titanate (TOT), diisobutyl bis(acetylacetonate) titanate (DIBAT), diisopropyl bis(acetylacetonate) titanate (DIPAT), diisopropyl bis(ethyl acetoacetate) titanate, dibutyl bis(ethyl acetoacetate) titanate, but not limited thereto. Examples of suitable organotin catalysts include dibutyltin dilaurate, dioctyltin dilaurate, dibutyltin maleate, dibutyltin diacetate, dibutyltin dioctoate, dibutyltin diacetyl acetonate, dibutyltin oxide and dioctyltin oxide, but not limited thereto.

According to the present invention, the amount of the ingredient (d) can be specified by those skilled in the art according to its type and the expected curing speed, generally in the range of from 0.01 wt % to 5 wt % based on the total weight of the starting materials of the polysiloxane composition.

In some embodiments of the present invention, ingredient (c) is used in an amount of from 0.01 to 2 parts, preferably from 0.05 to 1.5 parts, while ingredient (d1) is used in an amount of from 0.1 to 5 parts, preferably from 0.5 to 3 parts, based on 100 parts by weight of total starting materials of the polysiloxane composition.

According to the present invention, a polysiloxane composition containing ingredient (d) is a product that cures at room temperature and can be directly used as sealants, adhesives, and coating materials for the applications in construction, electronics, electrical and automobile sectors. Where ingredient (d) is not contained, the composition is a non-curable product that can be mixed with ingredient (d) before use.

Ingredient (e)

According to the present invention, the polysiloxane composition can further comprise a filler (e) to reinforce and to adjust the viscosity. The filler can be selected from among various fillers conventionally used in the art, for example filler (e1), containing fumed silica (including hydrophobic or hydrophilic pyrogenic silica, and hydrophobic or hydrophilic precipitated silica), and filler (e2), not containing fumed silica, such as calcium carbonate (including precipitated calcium carbonate, ground calcium carbonate, and activated calcium carbonate), fine ground silica, diatomaceous earth, talc, titanium dioxide, alumina, quartz powder, clay minerals, bentonite and kaolin, but not limited thereto. According to the present invention, the filler is preferably one containing fumed silica, or calcium carbonate.

According to the present invention, ingredient (e) is generally used in an amount of less than 70 wt %, for example, from 10 wt % to 50 wt %, based on the total weight of the starting materials of the polysiloxane composition.

In some embodiments of the present invention, the filler is filler (e1) used in an amount of from 1 wt % to 20 wt %, based on the total weight of the starting materials of the polysiloxane composition. In other embodiments of the present invention, the filler is filler (e2) used in an amount of from 10 wt % to 60 wt %, based on the total weight of the starting materials of the polysiloxane composition.

Ingredient (f)

According to the present invention, the polysiloxane composition can further comprise an adhesion promoter (f) to further improve the adhesion properties. The adhesion promoter can be selected from among various adhesion promoters conventionally used in the art, for example, γ-aminopropyltrimethoxysilane, γ-aminopropylmethyldimethoxysilane, N-β-(aminoethyl)-γ-aminopropyltrimethoxysilane, N-β-(aminoethyl)-γ-aminopropylmethyldimethoxysilane, N-phenyl-γ-aminopropyl trimethoprimoxysilane, N-cyclohexylaminomethyltrimethoxysilane, γ-glycidyloxypropyltrimethoxysilane, mercaptopropyltrimethoxysilane, 2,3-glycidoxypropyltrimethoxysilane, β-(3,4-epoxycyclohexyl)-ethyltrimethoxysilane, but not limited thereto.

In some embodiments of the present invention, ingredient (d) is an organotitanium catalyst (d1) and, in order to avoid catalyst poisoning, the adhesion promoter is preferably an epoxy silane, suitable examples being listed in the previous paragraph. In other embodiments of the present invention, ingredient (d) is an organotin catalyst (d2) and, in order to enhance adhesion, the adhesion promoter is preferably an aminosilane, suitable examples being listed the previous paragraph.

According to the present invention, ingredient (f) is generally used in an amount of less than 3 wt %, for example, from 0.1 wt % to 3 wt %, based on the total weight of the starting materials of the polysiloxane composition.

Other Optional Ingredients

The polysiloxane composition of the present invention can also optionally comprise other conventional aids and additives, such as diluents and plasticizers (e.g. dimethyl silicone oils with a dynamic viscosity of from 10 to 5000 mPa·s at 25° C., and mineral oils with a dynamic viscosity of from 10 to 100 mPa·s at 25° C.), UV absorbers (e.g. salicylic acid ester, benzophenone, benzotriazole, substituted acrylonitrile and triazine UV absorbers), and UV stabilizers (e.g. hindered amine light stabilizers), but are not limited thereto.

The polysiloxane composition of the present invention can be a one-component system more specially an alkoxy-curing one-component room temperature vulcanized silicone rubber system (RTV-1 type), or a two-component system more specially an alkoxy-curing two-component room temperature vulcanized silicone rubber system (RTV-2 type) where ingredient (d) and ingredient (a) are not incorporated in the same component.

In some embodiments, the present invention also provides a polysiloxane composition comprising the following ingredients:

the ingredient (a) as previously described, and
the ingredient (c) as previously described;

optionally, further comprising the ingredient (b) as previously described;

further optionally, comprising the ingredient (d) as previously described;

still further optionally, comprising the ingredient (e), (f) and/or other optional ingredients as previously described.

The second aspect of the present invention provides a method for preparing the polysiloxane composition according to the first aspect of the present invention, which comprises:

step 1: mixing ingredients (a)-(c) to react until the silanol groups in ingredient (a) substantially disappear;

and optionally step 2: adding ingredient (d) after the silanol groups in ingredient (a) substantially disappear.

Where the polysiloxane composition comprises ingredients (e) and (f) and other aids or additives, these ingredients can optionally be added all together while ingredients (a)-(c) are being mixed, or after the silanol groups in ingredient (a) substantially disappear.

As used herein, the wording "the silanol groups in ingredient (a) substantially disappear" means that the silanol groups in ingredient (a) are almost completely converted to other groups, and no silanol groups can be detected by a common test method. In a typical test method, tetrabutyl titanate (TBT) as a detection reagent is mixed with the reaction products of ingredients (a)-(c) at an appropriate ratio, for example, 1:50, and continuously stirred for 5-10 minutes to observe if there is a gel-thickening phenomenon. If no gel-thickening with continued stirring, it is considered that the silanol groups in ingredient (a) have substantially disappeared.

The third aspect of the present invention provides an elastomer obtained by curing ingredients (a)-(d) and optionally other ingredients as described in the first aspect of the present invention.

The invention is further illustrated by the following examples, but is not limited to the scope thereof. Any experimental methods with no conditions specified in the following examples are selected according to the conventional methods and conditions, or product specifications.

Inspection Method

1. Characterization of Viscosity Change During Preparation

The viscosity change during the preparation of the polysiloxane composition of the present invention is characterized by observing whether the viscosity of the mixture significantly rise, typically by observing whether the Weissenberg effect occurs.

If no Weissenberg effect occurs during the preparation of the polysiloxane composition, it indicates there is no significant increase in viscosity; if the Weissenberg effect occurs, it indicates a significant increase in viscosity. A typical example of "no Weissenberg effect occurring" is that when, in a reaction vessel with ½-⅔ vessel volume filled with the starting materials of the polysiloxane composition, the reaction takes place while stirring at a rate of 200-1,000 r/min with the stirring rod inserted below the initial liquid surface, the part of the stirring rod above the initial liquid surface has always less than 50% along the axial direction (measured from the initial liquid surface) adhered by the material, and the paddle can still stir the liquid properly. A typical example of "Weissenberg effect occurring" is that when, in a reaction vessel with ½-⅔ vessel volume filled with the starting materials of the polysiloxane composition, the reaction takes place while stirring at a rate of 200-1,000 r/min with the stirring rod inserted below the initial liquid surface, the part of the stirring rod above the initial liquid surface has more than 50% along the axial direction (measured from the initial liquid surface) adhered by the material, causing the paddle cannot properly stir the liquid, and in the extreme case, the starting materials become a mass adhering to and rotating along with the paddle.

Here, the typical examples of "no Weissenberg effect occurring" and "Weissenberg effect occurring" are specifically for a stirring system with a rod. As for a stirring system without a rod, or a screw extrusion system, the method for evaluating viscosity change during the preparation of the polysiloxane composition can be referred to the stirring system with a rod as described above.

2. Determination of the Reaction Time of Silanol Groups

The reaction time of silanol groups in the present invention refers to the elapsed time from the start of mixing ingredients (a)-(c) to the substantial disappearance of silanol groups in ingredient (a). The method to determine whether the silanol groups substantially disappear has been described above.

3. Determination of Tack-Free Time

The tack-free time of the polysiloxane composition herein is determined at 23±2° C. and 50±10% relative humidity.

4. Determination of Shore A Hardness

The Shore A hardness of the cured polysiloxane composition (hereinafter referred to as "elastomer") of the present invention is determined in accordance with ISO 7619-1:2004 (or Chinese Standard GB/T531.1-2008).

5. Measurement of Tensile Strength, Elongation at Break and 100% Modulus

The tensile strength, elongation at break, and 100% modulus of the elastomer of the present invention are measured in accordance with ISO 37-2011 (or Chinese Standard GB/T528-2009).

Examples 1-4: Polysiloxane Compositions

The ingredients of substance A were mixed in their individual amounts specified in Table 1 and stirred to enable reaction. After the silanol groups in the α,ω-dihydroxypolydimethylsiloxane substantially disappear, the substance B was added and mixed to obtain the product.

Comparative Examples 1-5

Comparative Examples 1-5 were prepared with the same method as in Examples 1-4, except that Comparative Example 1 did not contain substance B, Comparative Example 2 did not contain organotitanium compound 1, Comparative Example 3 used TOT instead of organotitanium compound 1, and Comparative Example 4 had the individual ingredients of substance B and substance A mixed together.

Table 1 shows the ingredients of Examples and Comparative Examples and amounts thereof. The amounts in Table 1 are, unless otherwise specified, in parts by weight.

Information on ingredients referred to in Table 1:

WACKER® POLYMER FD 80, an α,ω-dihydroxypolydimethylsiloxane, having a dynamic viscosity of about 75,000 mPa's, as measured at 23° C. according to DIN 53019, supplied by Wacker Chemicals.

WACKER® OH-POLYMER 1000, an α,ω-dihydroxypolydimethylsiloxane, having a dynamic viscosity of about 1000 mPa·s, as measured at 23° C. according to DIN 53019, supplied by Wacker Chemicals.

WACKER® AK 100, a polydimethylsiloxane, having a dynamic viscosity of 95-105 mPa·s, as measured at 25° C. according to DIN 53019, supplied by Wacker Chemicals.

HDK® H15, a hydrophobic pyrogenic silica, supplied by Wacker Chemicals.

PFLEX, a precipitated calcium carbonate, supplied by the U.S. Specialty Minerals Inc.

GENIOSIL® XL 10, a vinyltrimethoxysilane, supplied by Wacker Chemicals.

GENIOSIL® GF 80, 3-(2,3-Epoxypropoxy)propyltrimethoxysilane, supplied by Wacker Chemicals;

Organotitanium compound 1, with chemical formula being

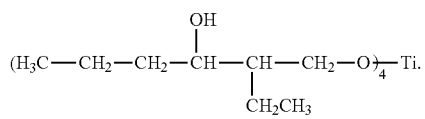

Other ingredients and reagents are all commercially available.

Table 2 shows the viscosity change and the reaction time of silanol groups during the preparation of the respective Examples and Comparative Examples. As can be seen from the Table, a Weissenberg effect did not occur during the preparation of the polysiloxane compositions of Examples 1-4 and Comparative Example 5, while it did during the preparation of the compositions of Comparative Examples 1-4. In addition, the time required was short for the reaction between the silanol groups of α,ω-dihydroxypolydimethylsiloxane and organotitanium compound 1.

Table 3 shows the tack-free time of the polysiloxane composition and the results of performance tests for Shore A hardness, tensile strength, elongation at break and 100 modulus of the elastomer obtained in Example 1. Examples 2-4 have results equivalent to those of Example 1. The composition of Comparative Example 1 remained uncured after 48 hours. The compositions of Comparative Examples 2-4 were not tested for product properties due to a apparent increase in viscosity during the preparation. The tack-free time of the composition of Comparative Example 5 was greatly extended, which means that too much organotitanium compound 1 will affect the dry tack and is not conducive to use in actual production.

TABLE 1

| Substance | Composition | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| A | WACKER® POLYMER FD 80 | 50 | 50.35 | 49.5 | 30 | 52 | 50.5 | 50 | 50 | 47.5 |
|   | WACKER® OH-POLYMER 1000 | 30 | 30 | 30 | / | 30 | 30 | 30 | 30 | 30 |

TABLE 1-continued

| Substance | Composition | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|---|
| | WACKER® AK100 | / | / | / | 15.5 | / | / | / | / | / |
| | HDK® H15 | 13 | 13 | 13 | / | 13 | 13 | 13 | 13 | 13 |
| | PFLEX | / | / | / | 50 | / | / | / | / | / |
| | GENIOSIL® XL 10 | 4 | 4 | 4 | 2 | 4 | 4 | 4 | 4 | 4 |
| | GENIOSIL® GF 80 | 0.5 | 0.5 | 0.5 | / | 0.5 | 0.5 | 0.5 | 0.5 | 0.5 |
| | Organotitanium compound 1 | 0.5 | 0.15 | 1 | 0.5 | 0.5 | / | / | 0.5 | 3 |
| | TOT | / | / | / | / | / | / | 0.5 | / | / |
| B | TBT | 2 | 2 | 2 | 2 | / | 2 | / | 2 | 2 |

TABLE 2

| | Example 1 | Example 2 | Example 3 | Example 4 | Comparative Example 1 | Comparative Example 2 | Comparative Example 3 | Comparative Example 4 | Comparative Example 5 |
|---|---|---|---|---|---|---|---|---|---|
| Viscosity change | No Weissenberg effect occurring | No Weissenberg effect occurring | No Weissenberg effect occurring | No Weissenberg effect occurring | Weissenberg effect occurring | Weissenberg effect occurring | Weissenberg effect occurring | Weissenberg effect occurring | No Weissenberg effect occurring |
| Reaction time of silanol groups | 45 min | 2.5 h | 30 min | 30 min | N/A | N/A | N/A | N/A | 20 min |

TABLE 3

| Indicator | Example 1 |
|---|---|
| Tack-free time (min) | 12 |
| Shore A hardness | 28 |
| Tensile strength (MPa) | 3.34 |
| Elongation at break (%) | 389.56 |
| 100% modulus (MPa) | 0.63 |

What is claimed is:

1. A polysiloxane composition comprising the following ingredients:
   (a) a hydroxyl-terminated polyorganosiloxane;
   (b) a multifunctional alkoxysilane; and
   (c) an organotitanium compound having the following general formula I or II, or a multipolymer thereof having a degree of polymerization of from 2 to 10,
   (i) an organotitanium compound I with the following formula I,

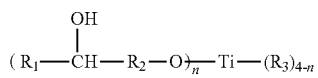
   $$(\text{R}_1\text{—CH(OH)—R}_2\text{—O})_n\text{—Ti—(R}_3)_{4-n} \quad \text{I}$$

where n is an arbitrary integer between 1 and 4,
R$_1$ is a saturated monovalent hydrocarbon group having from 1 to 16 carbon atoms,
R$_2$ is a saturated divalent hydrocarbon group having from 1 to 16 carbon atoms,
R$_3$ is a saturated monovalent hydrocarbon group having from 1 to 32 carbon atoms,
wherein the hydrocarbon groups are linear and/or branched;

(ii) an organotitanium compound II with the following general formula II,

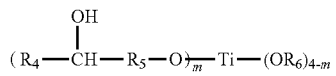
   $$(\text{R}_4\text{—CH(OH)—R}_5\text{—O})_m\text{—Ti—(OR}_6)_{4-m} \quad \text{II}$$

where m is an arbitrary integer between 2 and 4,
R$_4$ is a saturated monovalent hydrocarbon group having from 1 to 16 carbon atoms,
R$_5$ is a saturated divalent hydrocarbon group having from 1 to 16 carbon atoms,
R$_6$ is a saturated monovalent hydrocarbon group having from 4 to 32 carbon atoms,
wherein the hydrocarbon groups are linear and/or branched; and
optionally,
further comprising a catalyst (d).

2. The polysiloxane composition of claim 1, wherein ingredient (a) is employed in an amount of from 10 wt % to 85 wt % and ingredient (c) from 0.01 wt % to 2 wt %, based on the total weight of the starting materials of the polysiloxane composition.

3. The polysiloxane composition of claim 1, wherein ingredient (b) is employed in an amount of from 0.5 wt % to 5 wt % and ingredient (c) from 0.01 wt % to 2 wt %, based on the total weight of the starting materials of the polysiloxane composition.

4. The polysiloxane composition of claim 1, wherein ingredient (a) contains at least one hydroxyl-terminated polyorganosiloxane having a kinematic viscosity at 25° C. ranging from 1,000 to 100,000 mm$^2$/s.

5. The polysiloxane composition of claim 4, wherein ingredient (a) is employed in an amount of from 50 wt % to 85 wt %, based on the total weight of the starting materials of the polysiloxane composition.

6. The polysiloxane composition of claim 1, wherein ingredient (b) is a vinyl group-containing multifunctional alkoxysilane.

7. The polysiloxane composition of claim 1, wherein in the organotitanium compound of the formula I or II, $R_1$ or $R_4$ is a saturated monovalent hydrocarbon group having from 2 to 4 carbon atoms.

8. The polysiloxane composition of claim 1, wherein in the organotitanium compound of the formula I or II, $R_2$ or $R_5$ is a saturated divalent hydrocarbon group having from 3 to 5 carbon atoms.

9. The polysiloxane composition of claim 1, wherein ingredient (d) is an organotitanium catalyst (d1) or an organotin catalyst (d2).

10. The polysiloxane composition of claim 9, wherein ingredient (c) is employed in an amount of from 0.01 wt % to 2 wt % and ingredient (d1) from 0.1 wt % to 5 wt %, based on the total weight of the starting materials of the polysiloxane composition.

11. The polysiloxane composition of claim 1, further comprising a filler (e1), which contains fumed silica and is in an amount of from 1 wt % to 20 wt %, based on the total weight of the starting materials of the polysiloxane composition.

12. The polysiloxane composition of claim 1, which further comprises a filler (e2), which contains no fumed silica and is in an amount of from 10 wt % to 60 wt %, based on the total weight of the starting materials of the polysiloxane composition.

13. The polysiloxane composition of claim 1, further comprising an adhesion promoter (f).

14. The polysiloxane composition of claim 13, wherein ingredient (f) is an epoxy silane, when the polysiloxane composition comprises an organotitanium catalyst (d1), or ingredient (f) is an aminosilane, when the polysiloxane composition comprises an organotin catalyst (d2).

15. A method for preparing a polysiloxane composition of claim 1, comprising:
    mixing ingredients (a)-(c) and reacting until silanol groups in ingredient (a) substantially disappear; and
    optionally, in a further step adding ingredient (d) after the silanol groups in ingredient (a) have substantially disappeared.

* * * * *